(12) United States Patent
Mamba et al.

(10) Patent No.: US 9,678,598 B2
(45) Date of Patent: Jun. 13, 2017

(54) TOUCH PANEL

(75) Inventors: Norio Mamba, Kawasaki (JP); Koji Doi, Chiba (JP)

(73) Assignee: Japan Display Inc., Tokyo (JP)

( * ) Notice: Subject to any disclaimer, the term of this patent is extended or adjusted under 35 U.S.C. 154(b) by 947 days.

(21) Appl. No.: 13/305,787

(22) Filed: Nov. 29, 2011

(65) Prior Publication Data
US 2012/0139868 A1 Jun. 7, 2012

(30) Foreign Application Priority Data

Dec. 1, 2010 (JP) .................. 2010-267998

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...................................................... G06F 3/045
See application file for complete search history.

(56) References Cited

U.S. PATENT DOCUMENTS

| | | | |
|---|---|---|---|
| 7,102,364 B2 | 9/2006 | Umeda et al. | |
| 2003/0169906 A1* | 9/2003 | Gokturk et al. | 382/115 |
| 2007/0257890 A1* | 11/2007 | Hotelling | G06F 3/0418 345/173 |
| 2009/0273579 A1* | 11/2009 | Zachut | G06F 3/044 345/174 |
| 2010/0302202 A1* | 12/2010 | Takeuchi et al. | 345/174 |

FOREIGN PATENT DOCUMENTS

| | | |
|---|---|---|
| JP | 2005-140612 | 6/2005 |
| TW | 2009/35286 | 8/2009 |
| TW | 2010/19198 | 5/2010 |

OTHER PUBLICATIONS

English translation of Office Action in corresponding Taiwanese Application No. 100142439 dated Feb. 17, 2014.

* cited by examiner

*Primary Examiner* — Kent Chang
*Assistant Examiner* — Sepideh Ghafari
(74) *Attorney, Agent, or Firm* — Typha IP LLC

(57) ABSTRACT

A capacitive touch panel includes a scanning circuit portion for inputting a drive voltage to each scanning electrode sequentially in 1st to n-th sub detection periods, a capacitance detection circuit portion for detecting a capacitance detection signal of the each detecting electrode in the 1st to n-th groups, and a control circuit portion for calculating a capacitance detection signal change amount from the capacitance detection signals of a plurality of the detecting electrodes detected by the capacitance detection circuit portion, and calculating coordinates of a touch position based on the capacitance detection signal change amounts. The control circuit portion determines, in consecutive sub detection periods, the capacitance detection signal change amount of the each detecting electrode in two groups from which the capacitance detection signals are detected in the consecutive sub detection periods, based on the capacitance detection signals consecutively detected from at least one same detecting electrode.

10 Claims, 18 Drawing Sheets

FIG.15

|    | Y0 | Y1 | Y2 | Y3 | Y4 | Y5 |
|----|----|----|----|----|----|----|
| X0 | INI_NS1 (X0,Y0) | INI_NS1 (X0,Y1) | INI_NS1 (X0,Y2) | INI_NS1 (X0,Y3) | INI_NS1 (X0,Y4) | INI_NS1 (X0,Y5) |
| X1 | INI_NS1 (X1,Y0) | INI_NS1 (X1,Y1) | INI_NS1 (X1,Y2) | INI_NS1 (X1,Y3) | INI_NS1 (X1,Y4) | INI_NS1 (X1,Y5) |
| X2 | INI_NS1 (X2,Y0) | INI_NS1 (X2,Y1) | INI_NS1 (X2,Y2) | INI_NS1 (X2,Y3) | INI_NS1 (X2,Y4) | INI_NS1 (X2,Y5) |
| X3 | INI_NS1 (X3,Y0) | INI_NS1 (X3,Y1) | INI_NS1 (X3,Y2) | INI_NS1 (X3,Y3) | INI_NS1 (X3,Y4) | INI_NS1 (X3,Y5) |

|    | Y0 | Y1 | Y2 | Y3 | Y4 | Y5 |
|----|----|----|----|----|----|----|
| X3 | INI_NS2 (X3,Y0) | INI_NS2 (X3,Y1) | INI_NS2 (X3,Y2) | INI_NS2 (X3,Y3) | INI_NS2 (X3,Y4) | INI_NS2 (X3,Y5) |
| X4 | INI_NS2 (X4,Y0) | INI_NS2 (X4,Y1) | INI_NS2 (X4,Y2) | INI_NS2 (X4,Y3) | INI_NS2 (X4,Y4) | INI_NS2 (X4,Y5) |
| X5 | INI_NS2 (X5,Y0) | INI_NS2 (X5,Y1) | INI_NS2 (X5,Y2) | INI_NS2 (X5,Y3) | INI_NS2 (X5,Y4) | INI_NS2 (X5,Y5) |
| X6 | INI_NS2 (X6,Y0) | INI_NS2 (X6,Y1) | INI_NS2 (X6,Y2) | INI_NS2 (X6,Y3) | INI_NS2 (X6,Y4) | INI_NS2 (X6,Y5) |
| X7 | INI_NS2 (X7,Y0) | INI_NS2 (X7,Y1) | INI_NS2 (X7,Y2) | INI_NS2 (X7,Y3) | INI_NS2 (X7,Y4) | INI_NS2 (X7,Y5) |

FIG.16

|    | Y0 | Y1 | Y2 | Y3 | Y4 | Y5 |
|----|----|----|----|----|----|----|
| X0 | AJ_NS1 (X0,Y0) | AJ_NS1 (X0,Y1) | AJ_NS1 (X0,Y2) | AJ_NS1 (X0,Y3) | AJ_NS1 (X0,Y4) | AJ_NS1 (X0,Y5) |
| X1 | AJ_NS1 (X1,Y0) | AJ_NS1 (X1,Y1) | AJ_NS1 (X1,Y2) | AJ_NS1 (X1,Y3) | AJ_NS1 (X1,Y4) | AJ_NS1 (X1,Y5) |
| X2 | AJ_NS1 (X2,Y0) | AJ_NS1 (X2,Y1) | AJ_NS1 (X2,Y2) | AJ_NS1 (X2,Y3) | AJ_NS1 (X2,Y4) | AJ_NS1 (X2,Y5) |
| X3 | AJ_NS1 (X3,Y0) | AJ_NS1 (X3,Y1) | AJ_NS1 (X3,Y2) | AJ_NS1 (X3,Y3) | AJ_NS1 (X3,Y4) | AJ_NS1 (X3,Y5) |

|    | Y0 | Y1 | Y2 | Y3 | Y4 | Y5 |
|----|----|----|----|----|----|----|
| X3 | AJ_NS2 (X3,Y0) | AJ_NS2 (X3,Y1) | AJ_NS2 (X3,Y2) | AJ_NS2 (X3,Y3) | AJ_NS2 (X3,Y4) | AJ_NS2 (X3,Y5) |
| X4 | AJ_NS2 (X4,Y0) | AJ_NS2 (X4,Y1) | AJ_NS2 (X4,Y2) | AJ_NS2 (X4,Y3) | AJ_NS2 (X4,Y4) | AJ_NS2 (X4,Y5) |
| X5 | AJ_NS2 (X5,Y0) | AJ_NS2 (X5,Y1) | AJ_NS2 (X5,Y2) | AJ_NS2 (X5,Y3) | AJ_NS2 (X5,Y4) | AJ_NS2 (X5,Y5) |
| X6 | AJ_NS2 (X6,Y0) | AJ_NS2 (X6,Y1) | AJ_NS2 (X6,Y2) | AJ_NS2 (X6,Y3) | AJ_NS2 (X6,Y4) | AJ_NS2 (X6,Y5) |
| X7 | AJ_NS2 (X7,Y0) | AJ_NS2 (X7,Y1) | AJ_NS2 (X7,Y2) | AJ_NS2 (X7,Y3) | AJ_NS2 (X7,Y4) | AJ_NS2 (X7,Y5) |

TOUCH PANEL

CROSS-REFERENCE TO RELATED APPLICATION

The present application claims priority from Japanese application JP 2010-267998 filed on Dec. 1, 2010, the content of which is hereby incorporated by reference into this application.

BACKGROUND OF THE INVENTION

1. Field of the Invention

The present invention relates to a touch panel, and more particularly, to a touch panel capable of detecting a position at high accuracy while reducing noise.

2. Description of the Related Art

Mutual capacitive touch panels, which detect a capacitance near an intersection between an array of a plurality of detecting electrodes and a plurality of scanning electrodes arranged in a direction crossing the detecting electrodes by the detecting electrodes and the scanning electrodes, are widespread as touch panels capable of multipoint detection (see Japanese Patent Application Laid-open No. 2005-140612 below).

In recent years, equipment including a touch panel has been reduced in thickness in order to improve a design property, and hence has a reduced distance between the detecting electrodes and a display, which is a noise source, of the touch panel, which makes the touch panel more susceptible to noise.

In recent years, in order to realize further reduction in thickness, an on-cell touch panel, in which electrodes of the touch panel are formed on a color filter substrate of a liquid crystal display, has been under development. In this case, the distance between the detecting electrodes and the display is reduced, and it is impossible to provide a shield electrode (placed between the detecting electrodes and the display) for suppressing noise from the display, to thereby increase noise.

As in the mutual system, there have been proposed many methods for removing the noise in the capacitance detection for detecting a capacitance near the intersection between the scanning electrodes and the detecting electrodes. For example, a method involves providing a reference electrode at a place which is near the detecting electrodes and is affected to the same level from the noise source, and removing noise from results detected by the detecting electrodes based on noise detected by the reference electrode. Alternatively, in a case where the reference electrode is not provided, there has been proposed a method involving calculating a common noise amount from a plurality of electrodes detected at the same time, and removing noise from results detected by the detecting electrodes based on the common noise amount.

SUMMARY OF THE INVENTION

Of the noise suppression methods described above, the method involving providing the reference electrode requires providing the reference electrode in an effective display area of the display, which leads to a problem of reducing the actual touch panel operation region. Further, the reference electrode needs to be structured so that the reference electrode does not respond when a finger or the like touches the reference electrode and always detects only noise, and hence the structure of the touch panel needs to be newly changed.

On the other hand, in the method involving selecting and driving one scanning electrode, and calculating the common noise amount from the detection results of the plurality of detecting electrodes crossing the scanning electrode to remove noise, when signals caused by touching or the like are simultaneously input to a plurality of detecting electrodes, there is a problem in that a change in signal is cancelled as noise, and hence touch information cannot be detected at high accuracy.

Further, when the touch panel is integrated with the display, an intensity distribution of noise affecting the detecting electrodes varies depending on a display pattern and a configuration of the display (arrangement of driver circuit, driving method, and the like), which leads to a fear that effectiveness of the noise removal processing is reduced and detection cannot be performed accurately.

The present invention has been made to solve the problems inherent in the above-mentioned related technologies, and an object of the present invention is therefore to provide a technology that allows effective noise removal in a touch panel.

The above and other objects and novel features of the present invention become clear from the description of the specification and the accompanying drawings.

Representative aspects of the invention disclosed in the subject application are briefly described as follows. (1) There is provided a capacitive touch panel, including: a plurality of scanning electrodes arranged in a first direction; a plurality of detecting electrodes arranged in a second direction crossing the first direction; a scanning circuit portion for dividing one detection period, in which a drive voltage is input to one scanning electrode of the plurality of scanning electrodes, into n sub detection periods, where n≥2, and inputting the drive voltage sequentially to the one scanning electrode in the sub detection periods 1 to n; a capacitance detection circuit portion which detects a capacitance detection signal of each detecting electrode in a group of groups 1 to n, into which are divided the plurality of detecting electrodes so that at least one same detecting electrode is included in adjacent groups in the groups 1 to n, at the corresponding sub detection periods in the sub detection periods 1 to n; and a control circuit portion for calculating a capacitance detection signal change amount from the capacitance detection signal detected by the capacitance detection circuit portion, and calculating coordinates of a touch position based on the calculated capacitance detection signal change amount, in which the control circuit portion determines, in consecutive sub detection periods, the capacitance detection signal change amount of the each detecting electrode in two groups from which the capacitance detection signals are detected in the consecutive sub detection periods, based on the capacitance detection signals consecutively detected from the at least one same detecting electrode.

(2) In the capacitive touch panel according to the above-mentioned item (1), when the consecutive sub detection periods are a k-th sub detection period, where 1≤k≤n−1, and a (k+1)th sub detection period, the scanning circuit portion inputs the drive voltage to each scanning electrode in the k-th sub detection period and the (k+1)th sub detection period, the capacitance detection circuit portion receives an input of a signal from each detecting electrode in a k-th group in the k-th sub detection period to detect the capacitance detection signal of the each detecting electrode in the k-th group, and receives an input of a signal from each detecting electrode in a (k+1)th group in the (k+1)th sub detection period to detect the capacitance detection signal of the each detecting electrode in the (k+1)th group, and the control circuit portion includes: k-th common noise amount calculating means for calculating a common noise amount of the k-th group from the capacitance detection signal of the each detecting electrode in the k-th group detected by the capacitance detection circuit portion; k-th noise removing means for calculating the capacitance detection signal after noise removal of the each detecting electrode in the k-th group from the capacitance detection signal of the each detecting electrode in the k-th group detected by the capacitance detection circuit portion by using the common noise amount of the k-th group calculated by the k-th common noise amount calculating means; k-th change amount calculating means for calculating the capacitance detection signal change amount of the each detecting electrode in the k-th group from the capacitance detection signal after the noise removal of the each detecting electrode in the k-th group calculated by the k-th noise removing means; (k+1)th common noise amount calculating means for calculating a common noise amount of the (k+1)th group from the capacitance detection signal of the each detecting electrode in the (k+1)th group detected by the capacitance detection circuit portion; (k+1)th noise removing means for calculating the capacitance detection signal after noise removal of the each detecting electrode in the (k+1)th group from the capacitance detection signal of the each detecting electrode in the (k+1)th group detected by the capacitance detection circuit portion by using the common noise amount of the (k+1)th group calculated by the (k+1)th common noise amount calculating means; (k+1)th change amount calculating means for calculating the capacitance detection signal change amount of the each detecting electrode in the (k+1)th group from the capacitance detection signal after the noise removal of the each detecting electrode in the (k+1)th group calculated by the (k+1)th noise removing means; and change amount determining means for comparing the capacitance detection signal change amount of the at least one same detecting electrode calculated by the k-th change amount calculating means and the capacitance detection signal change amount of the at least one same detecting electrode calculated by the (k+1)th change amount calculating means, and determining the capacitance detection signal change amount of the each detecting electrode in the k-th group and the (k+1)th group based on a result of the comparison.

(3) In the capacitive touch panel according to the above-mentioned item (1) or (2), the capacitive touch panel is placed on a display panel, and the display panel includes a plurality of video lines arranged in the first direction. (4) In the capacitive touch panel according to the above-mentioned item (1), the capacitive touch panel is placed on a display panel, the display panel includes a plurality of video lines arranged in the first direction, the display panel displays the same color across a screen in a measurement correction amount calculating period, the scanning circuit portion inputs the drive voltage to the each scanning electrode in the measurement correction amount calculating period sequentially in 1st to n-th sub detection periods, the capacitance detection circuit portion receives an input of a signal from the each detecting electrode in 1st to n-th groups in the 1st to n-th sub detection periods in the measurement correction amount calculating period to detect the capacitance detection signal of the each detecting electrode in the 1st to n-th groups, and the control circuit portion calculates a noise correction amount for each of the 1st to n-th sub detection periods of the each scanning electrode and for the each detecting electrode in the 1st to n-th groups in the measurement correction amount calculating period.

(5) In the capacitive touch panel according to the above-mentioned item (2), the capacitive touch panel is placed on a display panel, the display panel includes a plurality of video lines arranged in the first direction, the display panel displays the same color across a screen in a measurement correction amount calculating period, the scanning circuit portion inputs the drive voltage to the each scanning electrode in the measurement correction amount calculating period sequentially in 1st to n-th sub detection periods, the capacitance detection circuit portion receives an input of a signal from the each detecting electrode in 1st to n-th groups in the 1st to n-th sub detection periods in the measurement correction amount calculating period to detect the capacitance detection signal of the each detecting electrode in the 1st to n-th groups, the control circuit portion includes: k-th detecting electrode noise amount calculating means for calculating a noise amount at every k-th sub detection period of the each scanning electrode and for the each detecting electrode in the k-th group from the capacitance detection signal of the each detecting electrode in the k-th group detected by the capacitance detection circuit portion in the measurement correction amount calculating period; k-th correction amount calculating means for calculating the noise correction amount at every k-th sub detection period of the each scanning electrode and for the each detecting electrode in the k-th group from the noise amount at every k-th sub detection period of the each scanning electrode and for the each detecting electrode in the k-th group calculated by the k-th detecting electrode noise amount calculating means; (k+1)th detecting electrode noise amount calculating means for calculating a noise amount at every (k+1)th sub detection period of the each scanning electrode and for the each detecting electrode in the (k+1)th group from the capacitance detection signal of the each detecting electrode in the (k+1)th group detected by the capacitance detection circuit portion; and (k+1)th correction amount calculating means for calculating the noise correction amount at every (k+1)th sub detection period of the each scanning electrode and for the each detecting electrode in the (k+1)th group from the noise amount at every (k+1)th sub detection period of the each scanning electrode and for the each detecting electrode in the (k+1)th group calculated by the (k+1)th detecting electrode noise amount calculating means, the k-th noise removing means calculates the capacitance detection signal after the noise removal of the each detecting electrode in the k-th group from the capacitance detection signal of the each detecting electrode in the k-th group detected by the capacitance detection circuit portion, by using the common noise amount of the k-th group and the noise correction amount at every k-th sub detection period of the each scanning electrode and for the each detecting electrode in the k-th group calculated by the k-th correction amount calculating means, and the (k+1)th common noise amount calculating means calculates the capacitance detection signal after the noise removal of the each detecting electrode in the (k+1)th group from the capacitance detection signal of the each detecting electrode in the (k+1)th group detected by the capacitance detection circuit portion, by using the common noise amount of the (k+1)th group and the noise correction amount at every the (k+1)th sub detection period of the each scanning electrodes and for the each detecting electrode in the (k+1)th group calculated by the (k+1)th correction amount calculating means.

An effect obtained by the representative aspects of the invention disclosed in the subject application is briefly described as follows.

According to the present invention, in the capacitive touch panel, noise can be removed effectively.

BRIEF DESCRIPTION OF THE DRAWINGS

In the accompanying drawings:

FIG. 15 is a diagram illustrating a distribution result of noise amounts of the touch panel according to the second embodiment of the present invention;

FIG. 16 is a diagram illustrating a distribution result of noise amount correction values of the touch panel according to the second embodiment of the present invention;

DETAILED DESCRIPTION OF THE INVENTION

Hereinafter, embodiments of the present invention are described in detail with reference to the accompanying drawings.

Note that, throughout the drawings illustrating the embodiments, the same reference symbol is given to components having the same function, and repeated description thereof is omitted. Also note that, the following embodiments are not intended to limit the interpretation of the scope of claims of the present invention.

[First Embodiment]

Figure 1A:
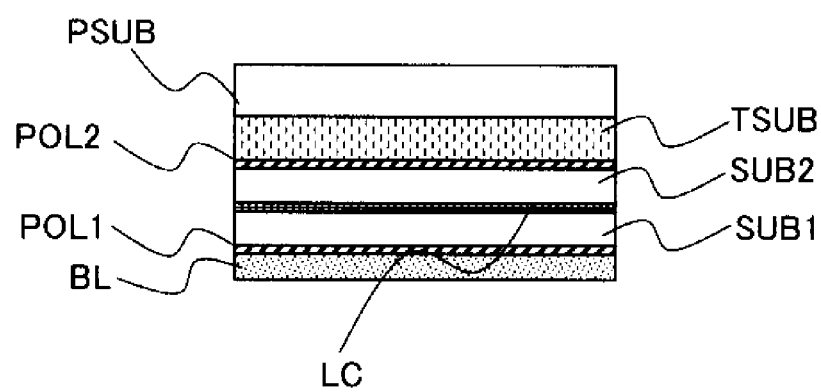
FIG. 1A is a cross-sectional view illustrating cross-sectional structure of an example of a display with a touch panel according to a first embodiment of the present invention.
Figure 1B:
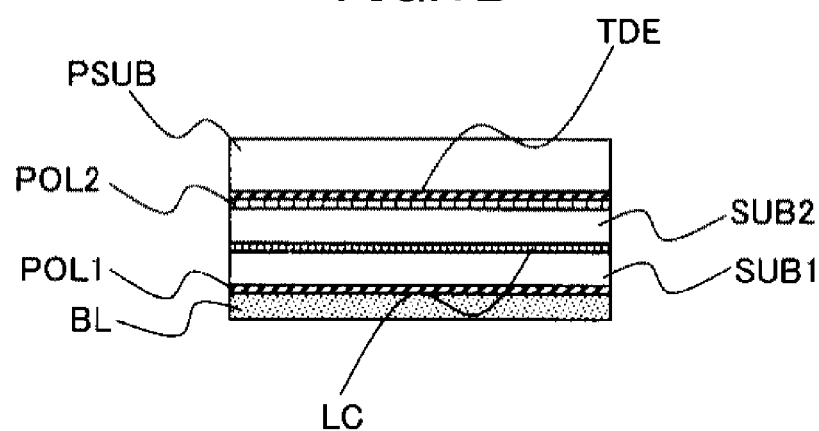
FIG. 1B is a cross-sectional view illustrating cross-sectional structure of another example of the display with the touch panel according to the first embodiment of the present invention.

FIGS. 1A and 1B are cross-sectional views of a display with a touch panel in which a touch panel according to embodiments of the present invention is mounted.

FIG. 1A illustrates structure in which an electrode for the touch panel is formed on a substrate (TSUB) different from that of the display, such as a glass substrate or a PET film, and the touchpanel substrate (TSUB) is combined with a liquid crystal display panel.

FIG. 1B illustrates structure of a touch panel integrated with a display (on-cell touch panel) in which a touch panel electrode TDE is formed on a color filter substrate (SUB2) on a display surface side of the liquid crystal display panel. The present invention is applicable to both the structure of FIG. 1A and the structure of FIG. 1B.

Note that, in FIGS. 1A and 1B, the liquid crystal display panel includes a backlight (BL), a TFT substrate (SUB1), a liquid crystal layer (LC), the color filter substrate (SUB2), a lower polarizer (POL1) formed on the TFT substrate (SUB1), and an upper polarizer (POL2) formed on the color filter substrate (SUB2).

Further, in FIGS. 1A and 1B, PSUB denotes a protection plate.

Figure 2:
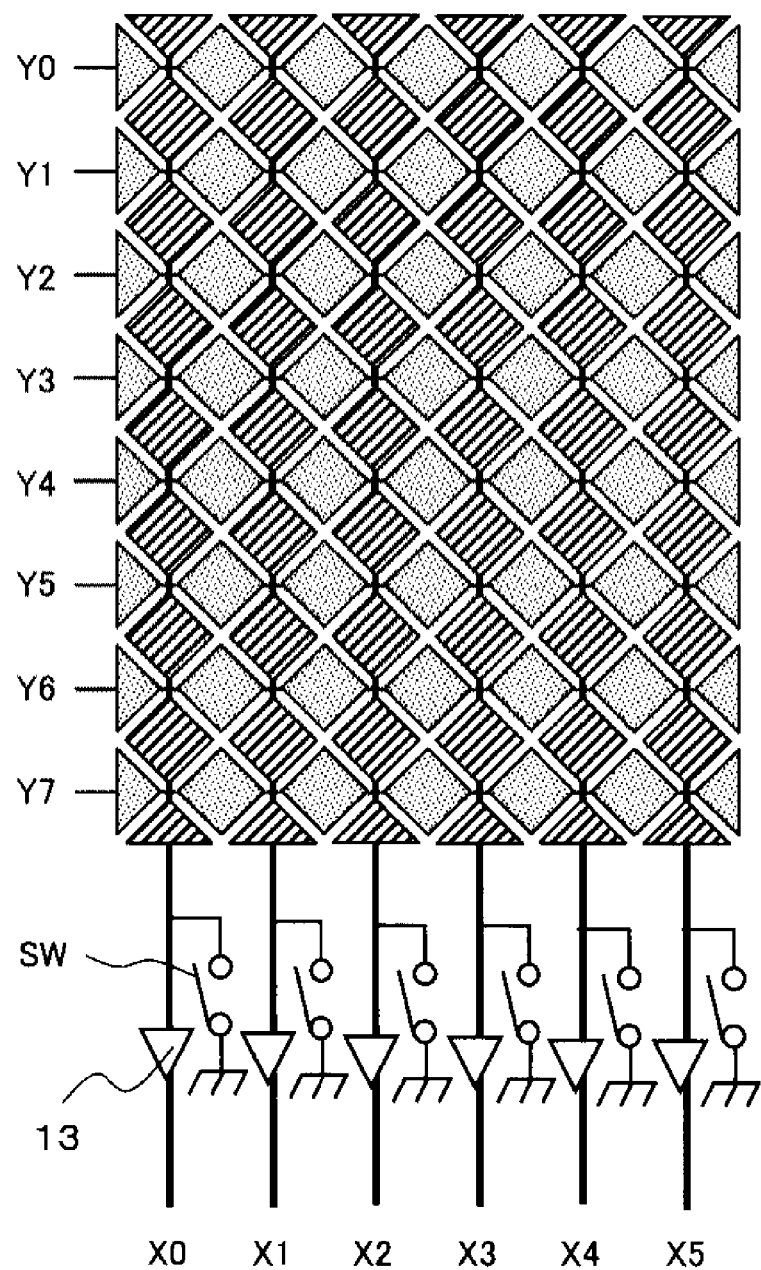
FIG. 2 is a plan view illustrating an electrode shape of the touch panel according to the first embodiment of the present invention.

FIG. 2 is a plan view illustrating an electrode shape of the capacitive touch panel according to a first embodiment of the present invention.

In this embodiment, in order to support the mutual system, the touch panel electrodes include scanning electrodes (Y0 to Y7) for inputting a drive voltage for each line, and detecting electrodes (X0 to X5) arranged so as to cross the scanning electrodes, for detecting a capacitance near an intersection. Note that, in FIG. 2, 13 denotes a capacitance detection circuit portion, and SW denotes a switch circuit.

When a detecting electrode is not selected, the switch circuit (SW) inputs a predetermined voltage (in this case, ground voltage) to the unselected detecting electrode.

Figure 3:
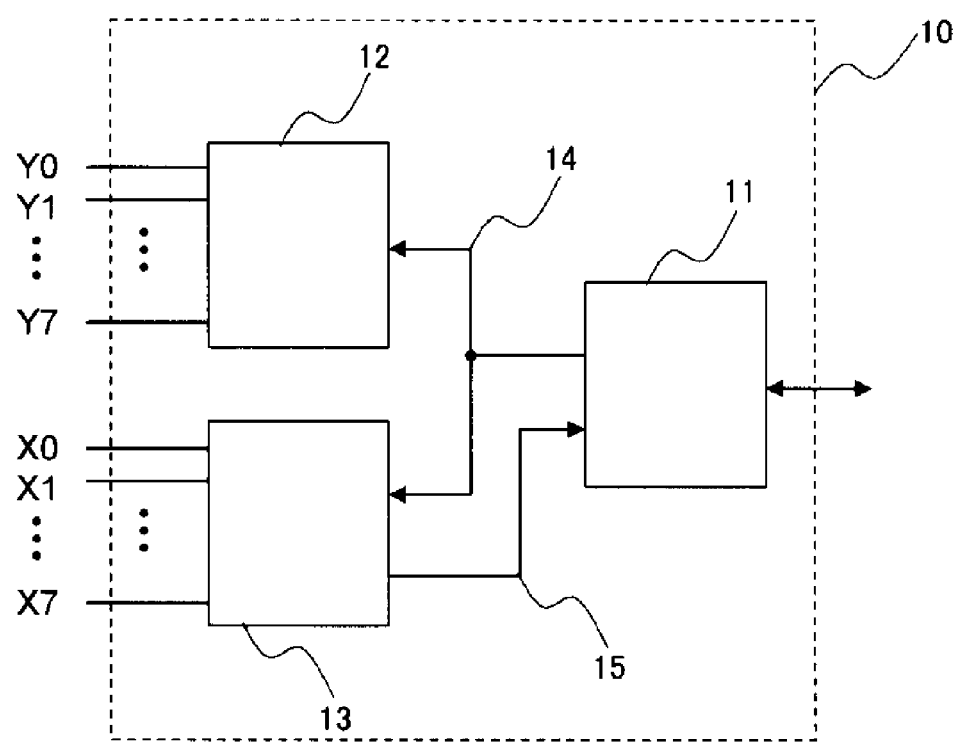
FIG. 3 is a block diagram of a control circuit of the touch panel according to the first embodiment of the present invention.

FIG. 3 is a block diagram of a control circuit of the touch panel according to the first embodiment of the present invention.

A control circuit 10 of the touch panel according to this embodiment includes a scanning circuit portion 12 for driving the scanning electrodes Y0 to Y7, the capacitance detection circuit portion 13 for detecting signals from the detecting electrodes X0 to X5, and a control circuit portion 11 for controlling operation of the scanning circuit portion 12 and the capacitance detection circuit portion 13 based on a control signal 14, and computing a touch position (input coordinates) of the touch panel based on a capacitance detection signal 15 from the capacitance detection circuit portion 13 for output to a host system, or controlling the operation of each circuit by receiving a signal from the host system.

Figure 4A:
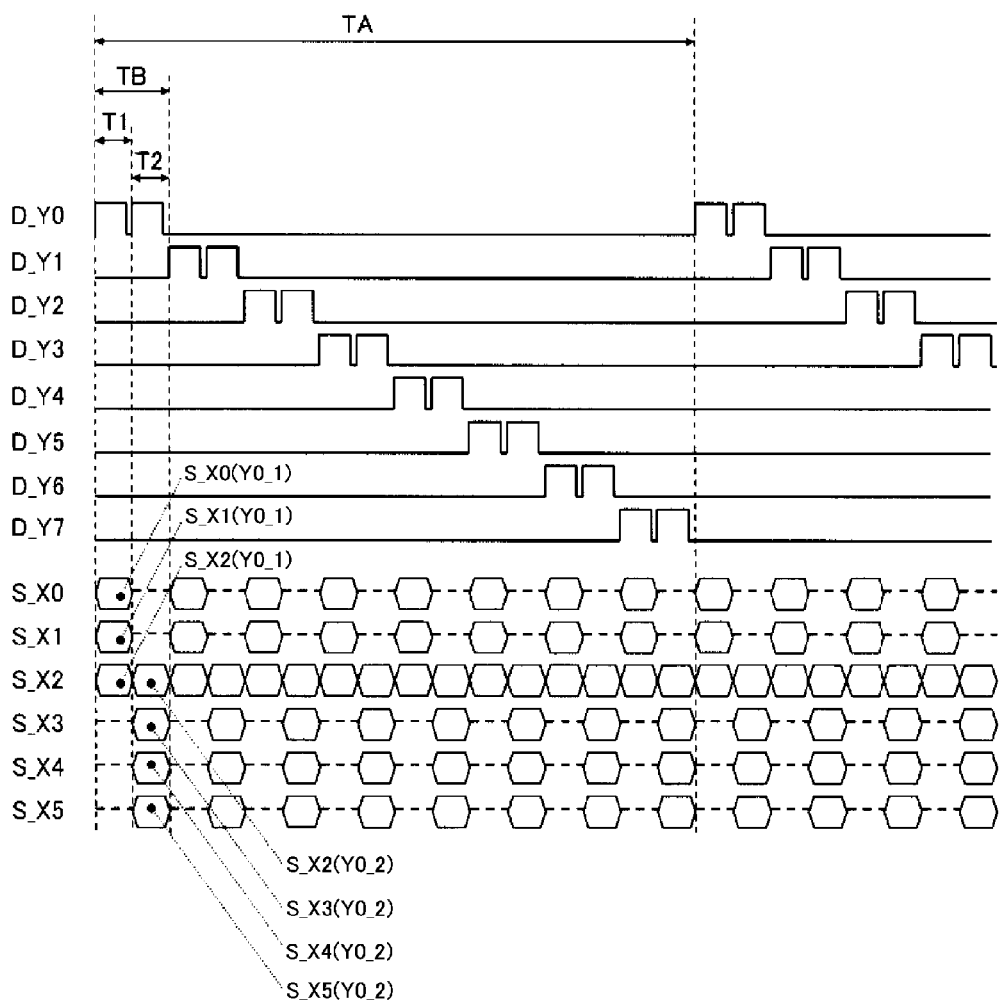
FIG. 4A is a timing chart illustrating an example of operation of the touch panel according to the first embodiment of the present invention.
Figure 4B:
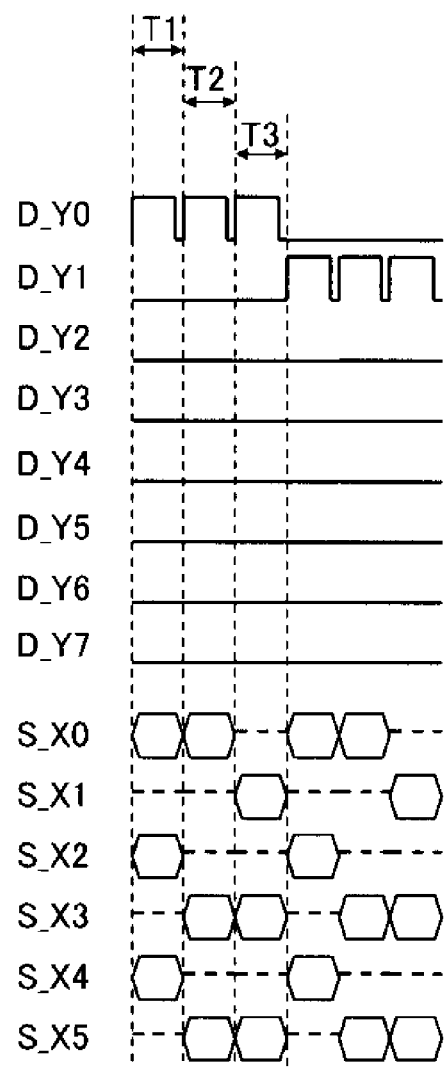
FIG. 4B is a timing chart illustrating another example of operation of the touch panel according to the first embodiment of the present invention.

FIGS. 4A and 4B are timing charts illustrating operation of the touch panel according to the first embodiment of the present invention.

For example, in a conventional driving method for the capacitive touch panel having the electrode shape illustrated in FIG. 2, in a detecting period TA, the drive voltage is sequentially input for one detection period TB to the scanning electrodes Y0 to Y7, and the touch position on the touch panel is detected based on capacitance detection signals detected by the detecting electrodes X0 to X5.

In this embodiment, the one detection period (TB) is divided into n (n≥2) sub detection periods (T1 and T2), and time sharing detection is performed. At this time, the detecting electrodes X0 to X5 are divided into n groups so that the capacitance detection signals are detected successively from at least one same detecting electrode (in FIG. 2, the detecting electrode X2) in successive sub detection periods.

In the case of FIG. 4A, the detecting electrodes X0 to Y5 are divided into two groups of the detecting electrodes X0 to X2 and the detecting electrodes X2 to X5, and the capacitance detection signals on the detecting electrode X2 are detected in common in the detection in the first sub detection period (T1) and in the detection in the second sub detection period (T2).

In this case, the detecting electrodes may be divided into any number of groups. Further, any dividing method may be employed so that the detecting electrodes are divided into three groups as illustrated in FIG. 4B.

In the case of FIG. 4B, the detecting electrodes X0 to X5 are divided into three groups of the detecting electrodes (X0, X2, and X4), the detecting electrodes (X0, X3, and X5), and the detecting electrodes (X1, X3, and X5), and the capacitance detection signals on the detecting electrode X0 are detected in common in the detection in the first sub detection period T1 and in the detection in the second sub detection period T2, and the capacitance detection signals on the detecting electrodes (X3 and X5) are detected in common in the detection in the second sub detection period T1 and in the detection in the third sub detection period T3.

Further, as illustrated in FIG. 2, the detecting electrodes that are not to be detected in the sub detection period are set to the ground potential by the switching circuit SW. Therefore, in the case of FIG. 4B, since detecting electrodes neighboring the detecting electrodes to be detected are set to a fixed potential, the effect of noise from the display becomes smaller and the detection accuracy becomes higher.

Figure 5:
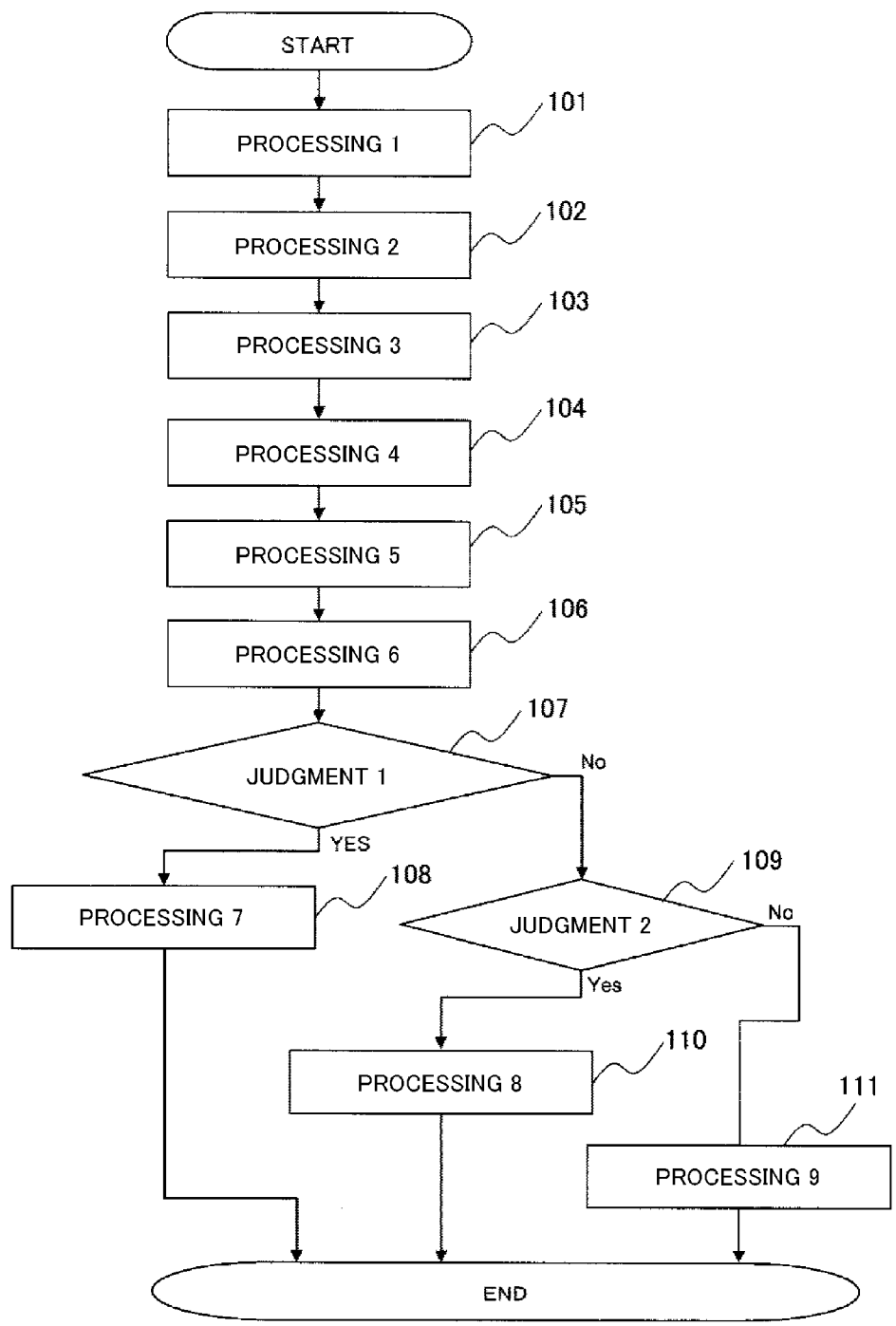
FIG. 5 is a flow chart illustrating operation of the control circuit of the touch panel according to the first embodiment of the present invention.

FIG. 5 is a flow chart illustrating operation of the control circuit 10 of the touch panel according to this embodiment.

Hereinafter, referring to FIG. 5, the operation of the control circuit of the touch panel according to this embodiment is described.

Note that, the processing of FIG. 5 is executed by the control circuit portion 11 of FIG. 3. Further, the touch panel on which the processing of FIG. 5 is predicated is the touch panel illustrated in FIG. 2. Further, the processing of FIG. 5 is executed after the detection in the first sub detection period T1 and the second sub detection period T2 in the one detection period TB of the scanning electrode Yn is finished.

Processing 1 in Step 101

A common noise amount NS_CMP1 in the first sub detection period T1 of capacitance detection signals S_X0(Yn_1), S_X1(Yn_1), and S_X2(Yn_1) detected in the first sub detection period T1 by the scanning electrode Yn is calculated.

Processing 2 in Step 102

Capacitance detection signals S_X0(Yn_1)', S_X1(Yn_1)', S_X2(Yn_1)' after the noise removal, which are obtained by removing noise by using the common noise amount NS_CMP1 of the capacitance detection signals S_X0(Yn_1), S_X1(Yn_1), and S_X2(Yn_1), are calculated.

Processing 3 in Step 103

From the capacitance detection signals after the noise removal, capacitance detection signal change amounts $\Delta S\_X0(Yn\_1)$, $\Delta S\_X1(Yn\_1)$, and $\Delta S\_X2(Yn\_1)$ of the detecting electrodes (X0, X1, and X2) detected in the first sub detection period T1 of the scanning electrode Yn are calculated.

Processing 4 in Step 104

A common noise amount NS_CMP2 in the second sub detection period T2 of the capacitance detection signals S_X2(Yn_2), S_X3(Yn_2), S_X4(Yn_2), and S_X5(Yn_2) detected in the second sub detection period T2 of the scanning electrode Yn is calculated.

Processing 5 in Step 105

Capacitance detection signals S_X2(Yn_2)', S_X3(Yn_2)', S_X4(Yn_2)', and S_X5(Yn_2)' after noise removal, which are obtained by removing noise by using the common noise amount (NS_CMP2) of the capacitance detection signals S_X2(Yn_2), S_X3(Yn_2), S_X4(Yn_2), and S_X5(Yn_2), are calculated.

Processing 6 in Step 106

From the capacitance detection signals after the noise removal, capacitance detection signal change amounts $\Delta S\_X2(Yn\_2)$, $\Delta S\_X3(Yn\_2)$, $\Delta S\_X4(Yn\_2)$, and $\Delta S\_X5(Yn\_2)$ of the detecting electrodes (X2, X3, X4, and X5) detected in the second sub detection period T2 of the scanning electrode Yn are calculated.

Judgment 1 in Step 107

It is judged whether or not a difference of the capacitance detection signal change amounts of the detecting electrode X2 is smaller than a certain threshold ERR_TH, that is, whether or not the relationship $|\Delta S\_X2(Yn\_2)-\Delta S\_X2(Yn\_1)|<Err\_Th$ is satisfied.

Processing 7 in Step 108

When the judgment result of Judgment 1 in Step 107 is YES, Case1 shown in Table 1 is adopted, and the capacitance detection signal change amounts $\Delta S\_X0(Yn\_1)$, $\Delta S\_X1(Yn\_1)$, $\Delta S\_X2(Yn\_1)$, $\Delta S\_X3(Yn\_2)$, $\Delta S\_X4(Yn\_2)$, and $\Delta S\_X5(Yn\_2)$ are adopted as signal detection values (SC_X0(Y1), SC_X1(Y1), SC_X2(Y1), SC_X3(Y1), SC_X4(Y1), and SC_X5(Y1)) of detecting electrodes X0 to X5 by the scanning electrode Yn. Note that, the capacitance detection signal change amount $\Delta S\_X2(Yn\_2)$ may be adopted as the signal detection value of the detecting electrode X2.

TABLE 1

| Signal detection value | Case 1 | Case 2 | Case 3 |
|---|---|---|---|
| SC_X0 (Yn) | ΔSC_X0 (Yn_1) | ΔS_X0 (Yn_1) + ΔS_X2 (Yn_2) | ΔS_X0 (Yn_1) |
| SC_X1 (Yn) | ΔSC_X1 (Yn_1) | ΔS_X1 (Yn_1) + ΔS_X2 (Yn_2) | ΔS_X1 (Yn_1) |
| SC_X2 (Yn) | ΔSC_X2 (Yn_1)* | ΔS_X2 (Yn_2) | ΔS_X2 (Yn_1) |
| SC_X3 (Yn) | ΔSC_X3 (Yn_2) | ΔS_X3 (Yn_2) | ΔS_X3 (Yn_2) + ΔS_X2 (Yn_1) |
| SC_X4 (Yn) | ΔSC_X4 (Yn_2) | ΔS_X4 (Yn_2) | ΔS_X4 (Yn_2) + ΔS_X2 (Yn_1) |
| SC_X5 (Yn) | ΔSC_X5 (Yn_2) | ΔS_X5 (Yn_2) | ΔS_X5 (Yn_2) + ΔS_X2 (Yn_1) |

*may also be ΔS_X2 (Yn_2)

Judgment 2 in Step 109

When the judgment result of Judgment 1 in Step 107 is NO, it is judged whether or not the relationship ΔS_X2 (Yn_2)>ΔS_X2(Yn_1) is satisfied.

Processing 8 in Step 110

When the judgment result of Judgment 2 in Step 109 is YES, Case2 shown in Table 1 is adopted, and the capacitance detection signal change amounts ΔS_X0(Yn_1)+ΔS_X2(Yn_2), ΔS_X1(Yn_1)+ΔS_X2(Yn_2), ΔS_X2 (Yn_2), ΔS_X3(Yn_2), ΔS_X4(Yn_2), ΔS_X5(Yn_2) are adopted as the signal detection values of the detecting electrodes X0 to X5 by the scanning electrode Yn.

Processing 9 in Step 111

When the judgment result of Judgment 2 in Step 109 is NO, Case3 shown in Table 1 is adopted, and the capacitance detection signal change amounts ΔS_X0(Yn_1), ΔS_X1 (Yn_1), ΔS_X2(Yn_1), ΔS_X3(Yn_2)+ΔS_X2(Yn_1), ΔS_X4(Yn_2)+ΔS_X2(Yn_1), and ΔS_X5(Yn_2)+ΔS_X2 (Yn_1) are adopted as the signal detection values of the detecting electrodes X0 to X5 by the scanning electrode Yn.

Note that, in Processing 1 in Step 101 and Processing 4 in Step 104, the common noise amounts (NS_CMP1 and NS_CMP2) may be calculated from an average of fluctuation amounts of the capacitance detection signals of the detecting electrodes detected at the same time, may be a minimum fluctuation value, or may be an intermediate value, for example.

Further, in Processing 3 in Step 103 and Processing 5 in Step 105, the capacitance detection signal change amounts are calculated with the capacitance detection signals while the touch panel is not touched as reference values. Each of the reference values may be an average value of the capacitance detection signals in a period of no touch.

Figure 6:
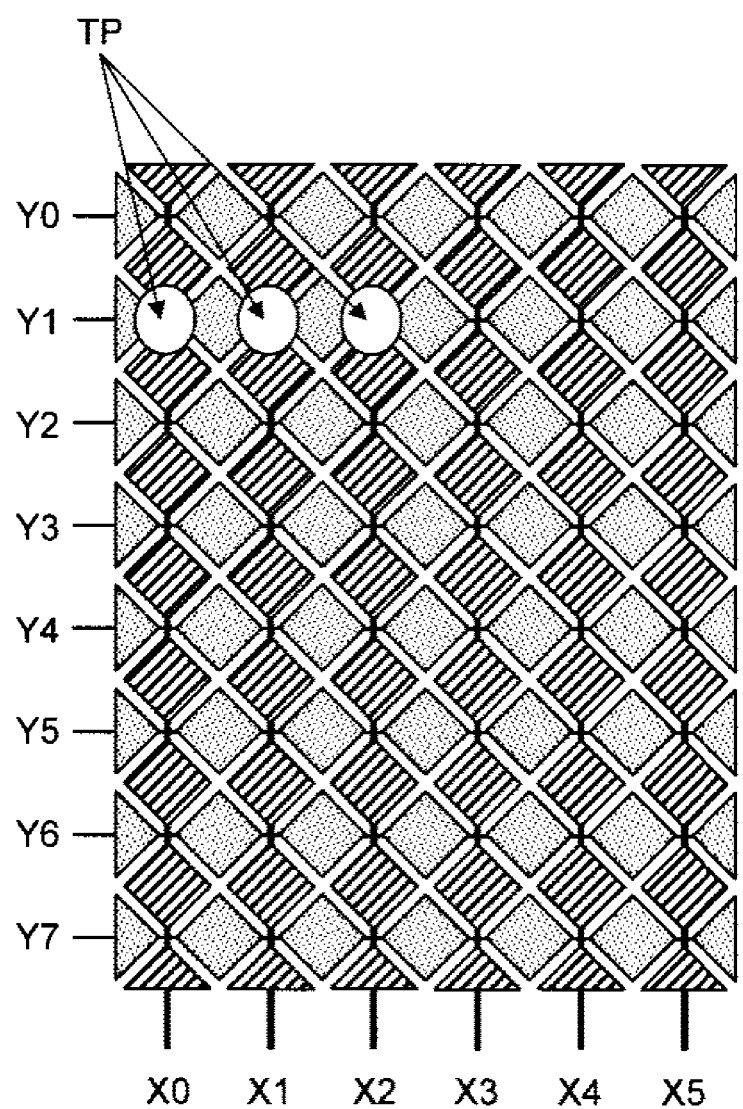
FIG. 6 is a schematic diagram illustrating touch positions of the touch panel according to the first embodiment of the present invention.

FIG. 6 is a schematic diagram illustrating touch positions of the touch panel according to this embodiment. FIG. 6 illustrates a case where touch inputs are made simultaneously to three intersections (TP of FIG. 6) between the scanning electrode Y1 and the detecting electrodes X0 to X2 illustrated in FIG. 2.

Figure 7:
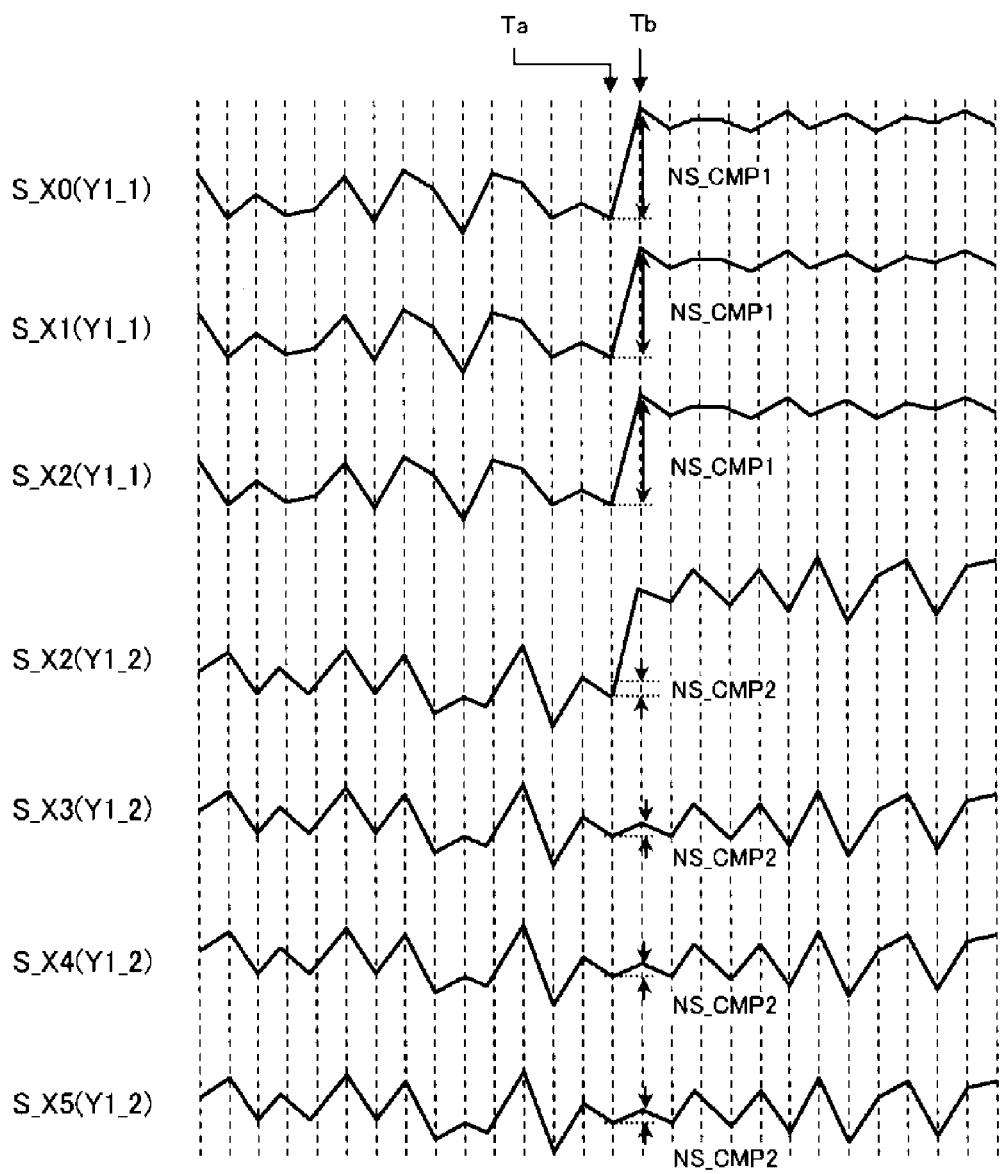
FIG. 7 is a waveform diagram of capacitance detection signals before noise processing detected by detecting electrodes X0 to X5 in a case where inputs illustrated in FIG. 6 are made to the touch panel according to the first embodiment of the present invention.

FIG. 7 is a waveform diagram of the capacitance detection signals before noise processing (S_X0(Yn_1), S_X1(Yn_1), S_X2(Yn_1), S_X2 (Yn_2), S_X3(Yn_2), S_X4(Yn_2), and S_X5(Yn_2)) detected by the detecting electrodes X0 to X5 in a case where the inputs illustrated in FIG. 6 are made to the touch panel according to this embodiment. Note that, in FIG. 7, and in FIGS. 8 and 9 to be described below, Ta denotes the sub detection period when the touch panel is not touched, and Tb denotes the sub detection period when the touch panel is touched.

Figure 8:
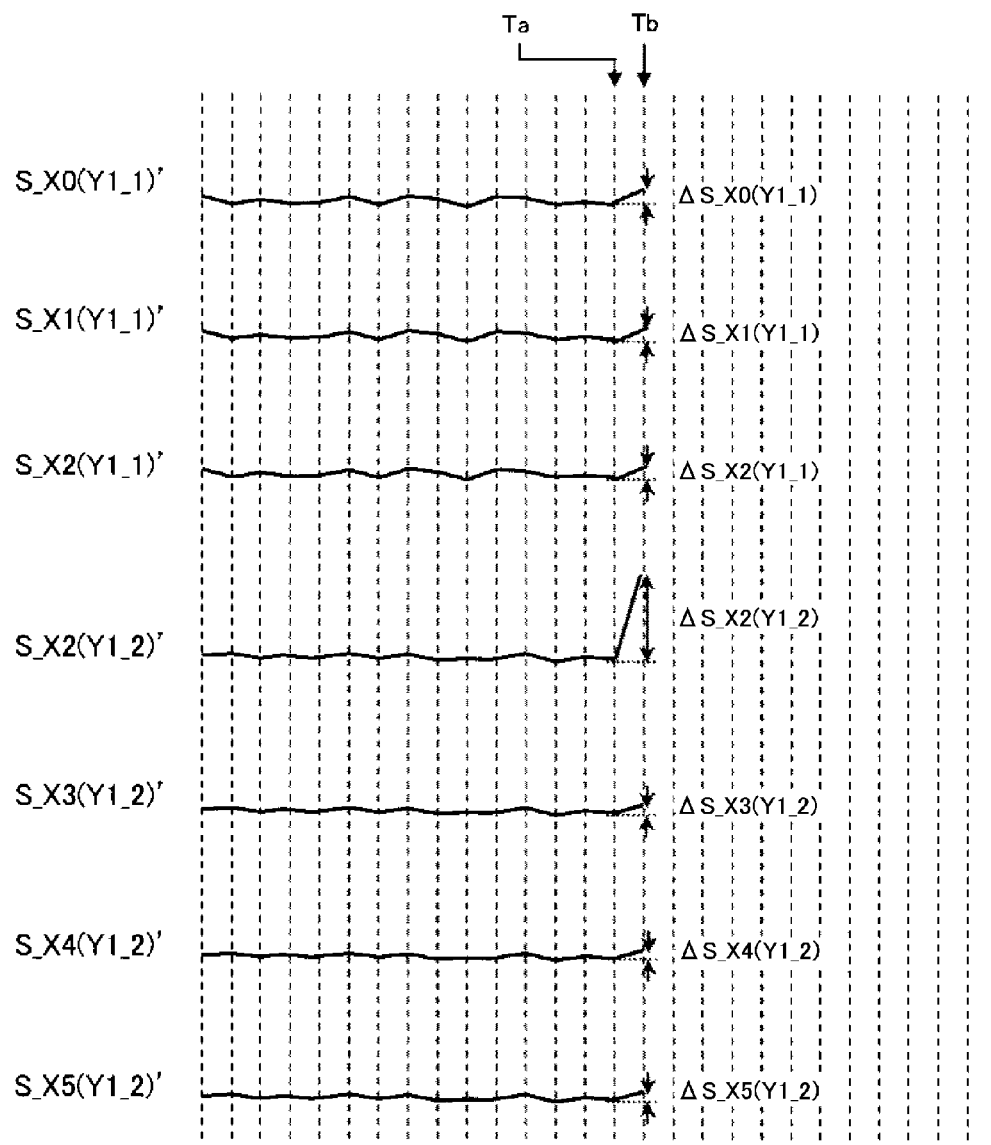
FIG. 8 is a waveform diagram of capacitance detection signals after the noise processing detected by the detecting electrodes X0 to X5 in the case where the inputs illustrated in FIG. 6 are made to the touch panel according to the first embodiment of the present invention and after the noise is removed in accordance with the flow chart illustrated in FIG. 5.

FIG. 8 is a waveform diagram of the capacitance detection signals after the noise processing S_X0(Yn_1)', S_X1 (Yn_1)', S_X2(Yn_1)', S_X2(Yn_2)', S_X3(Yn_2)', S_X4 (Yn_2)', and S_X5(Yn_2)' detected by the detecting electrodes X0 to X5 in the case where the inputs illustrated in FIG. 6 are made to the touch panel according to this embodiment and after the noise is removed in accordance with the flow chart illustrated in FIG. 5.

In the first sub detection period T1, the inputs are simultaneously made to the detecting electrodes X0 to X2, and the changed amount is processed as the common noise amount so as to eliminate a signal increase (decrease) due to the touch inputs in the capacitance detection signals after the noise removal. On the other hand, in the detecting electrode X2 in the second sub detection period T2, no signal input is made to the other detecting electrodes X3 to X5, with the result that the signal change amount due to the touch remains in the capacitance detection signals after the noise removal.

Figure 9:
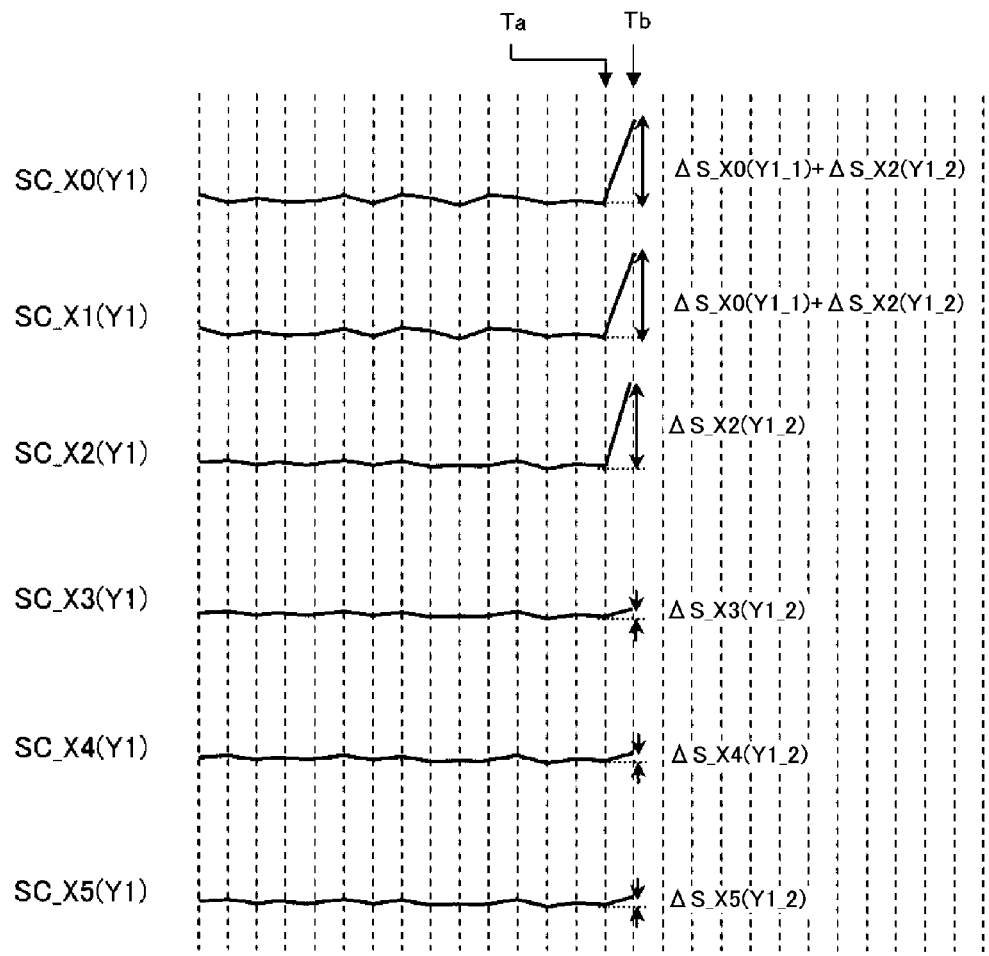
FIG. 9 is a waveform diagram of signal detection values calculated in accordance with the flow chart illustrated in FIG. 5 in the case where the inputs illustrated in FIG. 6 are made to the touch panel according to the first embodiment of the present invention.

FIG. 9 is a waveform diagram of the signal detection values ΔS_X0(Yn_1)+ΔS_X2(Yn_2), ΔS_X1(Yn_1)+ΔS_X2(Yn_2), ΔS_X2(Yn_2), ΔS_X3(Yn_2), ΔS_X4 (Yn_2), and ΔS_X5(Yn_2) calculated in accordance with the flow chart illustrated in FIG. 5 in the case where the inputs illustrated in FIG. 6 are made to the touch panel according to the first embodiment of the present invention.

In the case of FIG. 6, the capacitance detection signal change amounts detected by the detecting electrode X2 is larger for the result in the second sub detection period, and hence the signal detection values are calculated based on Case2 of Table 1.

Figure 10:
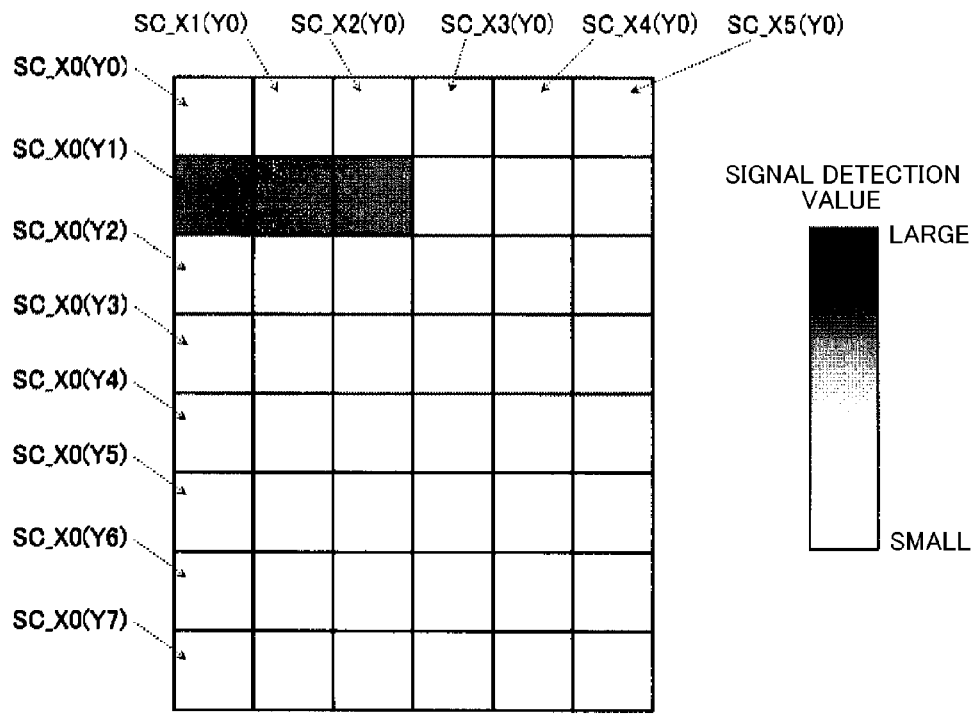
FIG. 10 is a distribution diagram of the signal detection values in the case where the inputs illustrated in FIG. 6 are made to the touch panel according to the first embodiment of the present invention.

FIG. 10 is a distribution diagram of the signal detection values in the case where the inputs illustrated in FIG. 6 are made to the touch panel according to this embodiment, and in a case where the flow chart illustrated in FIG. 5 is executed sequentially on the scanning electrodes Y0 to Y7. As illustrated in FIG. 10, in this embodiment, even in the case where multipoint inputs are made simultaneously as illustrated in FIG. 6, the positions may be detected at high accuracy while reducing noise.

[Second Embodiment]

Figure 11:
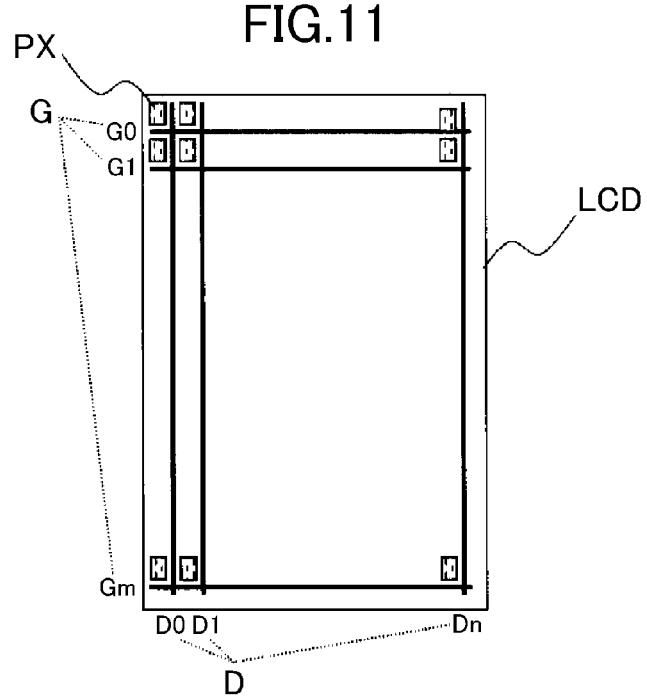
FIG. 11 is a plan view of a display according to a second embodiment of the present invention.

FIG. 11 is a plan view of a display according to a second embodiment of the present invention. FIG. 11 is a plan view of the display illustrated in FIG. 1A or 1B. In FIG. 11, LCD denotes a display, G0 to Gm denote scanning lines, D0 to Dn denote video lines, and PX denotes a pixel.

Figure 12:
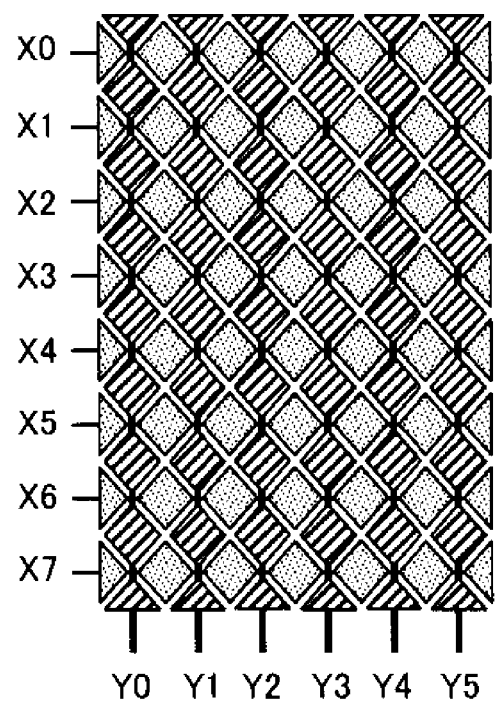
FIG. 12 is a plan view illustrating an electrode shape of a touch panel according to the second embodiment of the present invention.

FIG. 12 is a plan view illustrating an electrode shape of a touch panel according to the second embodiment of the present invention. FIG. 12 is a plan view illustrating detecting electrodes (X0 to X7) and scanning electrodes (Y0 to Y5) of the touch panel illustrated in FIG. 1A or 1B. Note that, in FIG. 12, a buffer circuit (BA) and a switch circuit (SW) are omitted from the drawing.

In this embodiment, the first point is to arrange the video lines (D0 to Dn) of the display (LCD) and the detecting electrodes (X0 to X7) of the touch panel cross each other.

Figure 13:
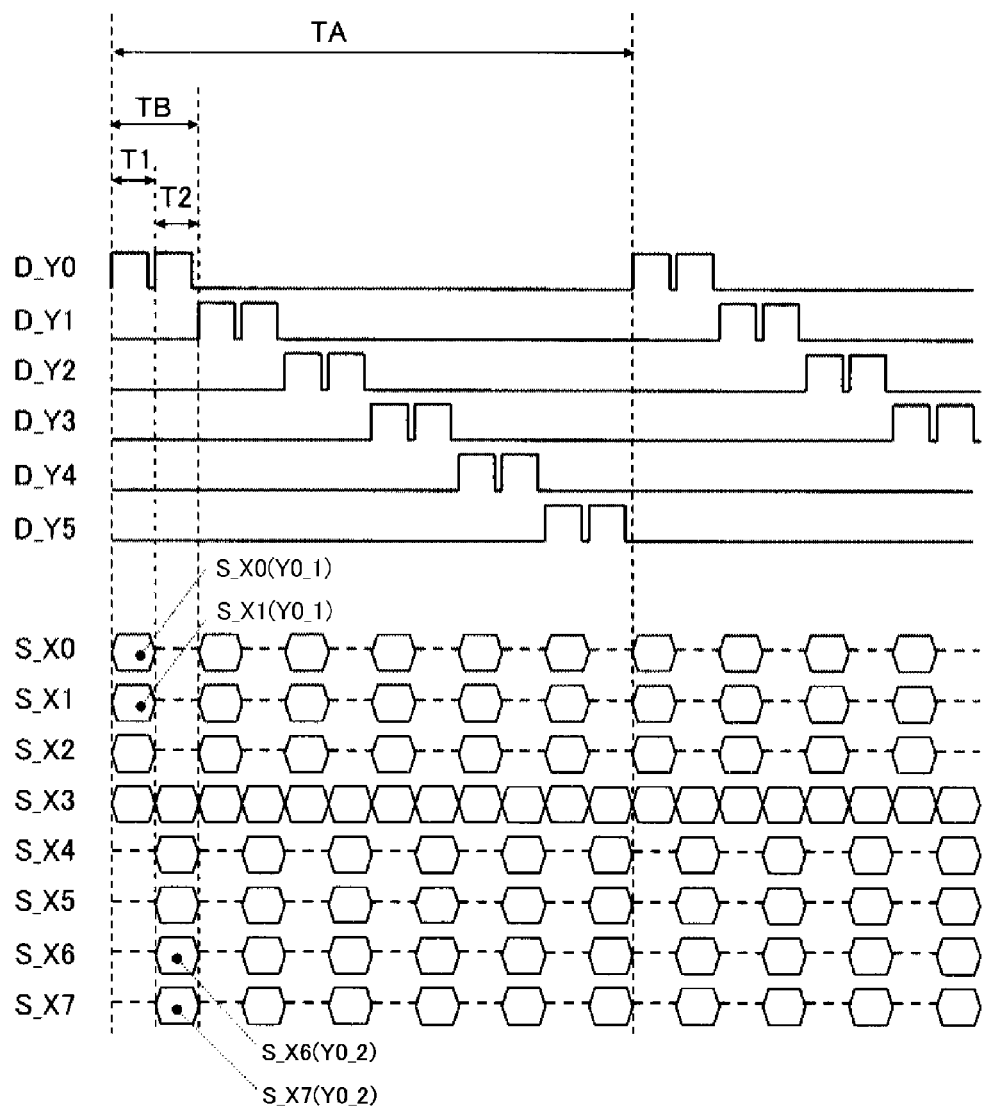
FIG. 13 is a timing chart illustrating operation of the touch panel according to the second embodiment of the present invention.

FIG. 13 is a timing chart illustrating operation of the touch panel according to the second embodiment of the present invention. FIG. 13 is a timing chart illustrating operation of the touch panel illustrated in FIG. 12. The detection operation is the same as in the first embodiment described above, and hence a description thereof is omitted.

The second point of this embodiment is to measure a noise distribution in a case where a display pattern that is uniform across the screen (for example, white screen or black screen) is displayed on the display, and to calculate a noise correction amount from the distribution result.

In this manner, the effect of the noise distribution that varies depending on the display pattern, a driving circuit arrangement of the display, a driving method, and the like is reduced, with the result that the noise removal efficiency may be increased and the signal may be detected at high accuracy.

Figure 14:
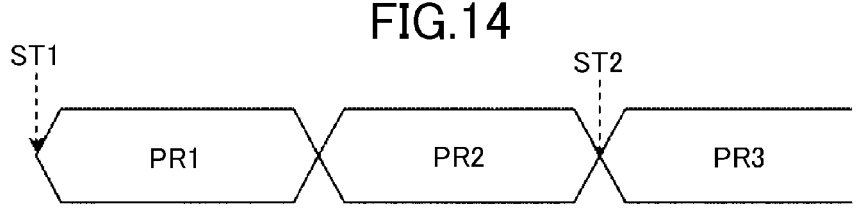
FIG. 14 is an operation state diagram of the touch panel according to the second embodiment of the present invention.

FIG. 14 is an operation state diagram of the touch panel according to the second embodiment of the present invention.

In this embodiment, after the touch panel is started up (ST1 of FIG. 14), a period for performing correction or initialization of the capacitance detection circuit portion 13 illustrated in FIG. 3 (PR1; correction processing period for capacitance detection circuit portion) is provided.

Then, in this embodiment, a period for measuring a noise amount distribution (PR2; calculation period for correction amount for measuring noise amount) in a state, in which the display pattern that is uniform across the display is displayed, is provided in a period after the correction or initialization of the capacitance detection circuit portion 13 is finished and before usual capacitance detection is started. This calculation period for correction amount for measuring noise amount PR2 may be performed at the time of start-up or after a normal detection period PR3, which is started after a normal detection start (ST2 of FIG. 14) is finished, and the timing is not specifically defined.

In the calculation period for the correction amount for measuring noise amount PR2, the same display pattern is displayed over the display. For example, the display pattern such as solid white or solid black is displayed. Noise amounts may be calculated from the maximum value (Max) and the minimum value (Min) or from the variance in a case where the capacitance detection signals are detected for a predetermined period of time for each of the sub detection periods of the scanning electrodes and for each of the detecting electrodes.

FIG. 15 is a diagram illustrating a distribution result of the noise amounts of the touch panel according to the second embodiment of the present invention. FIG. 15 is a diagram illustrating a measurement result (distribution) of noise amounts INI_NS measured in the calculation period for correction amount for measuring noise amount PR2 in the case of the electrode shape (scanning electrodes Y0 to Y5 and detecting electrodes X0 to X7) illustrated in FIG. 12.

FIG. 16 is a diagram illustrating a distribution result of noise amount correction values of the touch panel according to the second embodiment of the present invention. FIG. 16 illustrates noise amount correction values AJ_NS calculated from the distribution of the noise amounts of FIG. 15. The noise amount correction value AJ_NS is calculated, for example, so as to be proportional to the noise amount INI_NS as AJ_NS=A×noise amount INI_NS (where A is a proportionality coefficient).

Figure 17:
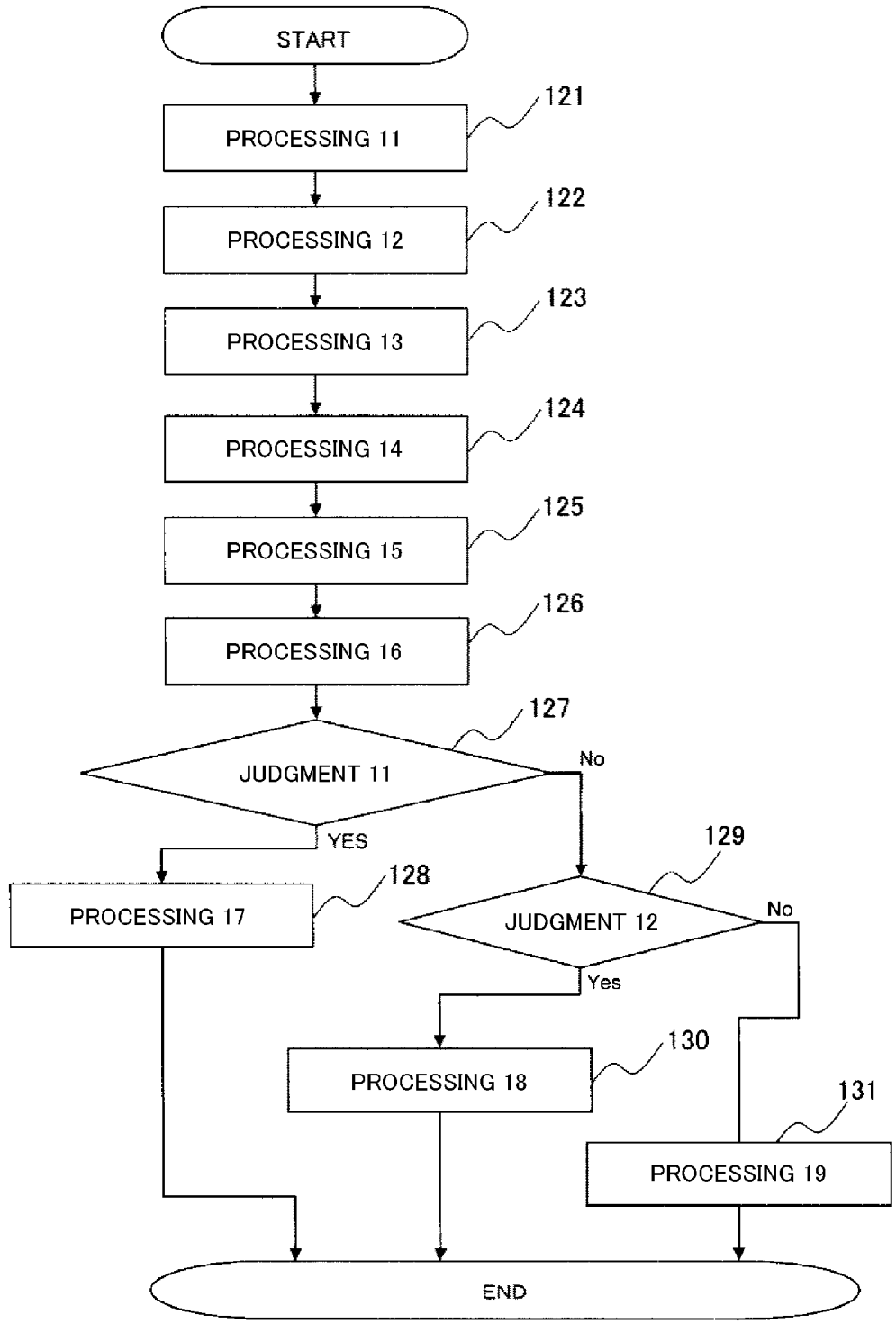
FIG. 17 is a flow chart illustrating operation of a control circuit of the touch panel according to the second embodiment of the present invention.

FIG. 17 is a flow chart illustrating operation of the control circuit of the touch panel according to the second embodiment of the present invention. Hereinafter, referring to FIG. 17, the operation of the control circuit of the touch panel according to this embodiment is described.

Note that, the processing of FIG. 17 is executed by the control circuit portion 11 of FIG. 3. Further, the touch panel on which the processing of FIG. 17 is predicated is the touch panel illustrated in FIG. 12. Further, the processing of FIG. 17 is executed after the detection in the first sub detection period T1 and the second sub detection period T2 in the one detection period TB of the scanning electrode Yn is finished.

Processing 11 in Step 121

A common noise amount NS_CMP1 in the first sub detection period T1 of capacitance detection signals S_X0(Yn_1), S_X1(Yn_1), and S_X2(Yn_1) detected in the first sub detection period T1 by the scanning electrode Yn is calculated.

Processing 12 in Step 122

Capacitance detection signals S_X0(Yn_1)', S_X1(Yn_1)', S_X2(Yn_1)' after the noise removal, which are obtained by removing noise by using the common noise amount NS_CMP1 of the capacitance detection signals S_X0(Yn_1), S_X1(Yn_1), and S_X2(Yn_1) and the noise amount correction values AJ_NS, are calculated.

Processing 13 in Step 123

From the capacitance detection signals after the noise removal, capacitance detection signal change amounts ΔS_X0(Yn_1), ΔS_X1(Yn_1), and ΔS_X2(Yn_1) of the detecting electrodes (X0, X1, and X2) detected in the first sub detection period 11 of the scanning electrode Yn are calculated.

Processing 14 in Step 124

A common noise amount NS_CMP2 in the second sub detection period T2 of the capacitance detection signals S_X2(Yn_2), S_X3(Yn_2), S_X4(Yn_2), and S_X5(Yn_2) detected in the second sub detection period T2 of the scanning electrode Yn is calculated.

Processing 15 in Step 125

Capacitance detection signals S_X2(Yn_2)', S_X3(Yn_2)', S_X4(Yn_2)', and S_X5(Yn_2)' after noise removal, which are obtained by removing noise by using the common noise amount (NS_CMP2) of the capacitance detection signals S_X2(Yn_2), S_X3(Yn_2), S_X4(Yn_2), and S_X5(Yn_2) and the noise amount correction values AJ_NS, are calculated.

Processing 16 in Step 126

From the capacitance detection signals after the noise removal, capacitance detection signal change amounts ΔS_X2(Yn_2), ΔS_X3(Yn_2), ΔS_X4(Yn_2), and ΔS_X5(Yn_2) of the detecting electrodes (X2, X3, X4, and X5) detected in the second sub detection period T2 of the scanning electrode Yn are calculated.

Judgment 11 in Step 127

It is judged whether or not a difference of the capacitance detection signal change amounts of the detecting electrode X2 is smaller than a certain threshold ERR_TH, that is, whether or not the relationship |ΔS_X2(Yn_2)−ΔS_X2(Yn_1)|<Err_Th is satisfied.

Processing 17 in Step 128

When the judgment result of Judgment 11 in Step 127 is YES, Case1 shown in Table 1 is adopted, and the capacitance detection signal change amounts ΔS_X0(Yn_1), ΔS_X1(Yn_1), ΔS_X2(Yn_1), ΔS_X3(Yn_2), ΔS_X4(Yn_2), and ΔS_X5(Yn_2) are adopted as signal detection values (SC_X0(Y1), SC_X1(Y1), SC_X2(Y1), SC_X3(Y1), SC_X4(Y1), and SC_X5(Y1)) of the detecting electrodes X0 to X5 by the scanning electrode Yn. Note that, the capacitance detection signal change amount ΔS_X2(Yn_2) may be adopted as the signal detection value of the detecting electrode X2.

Judgment 12 in Step 129

When the judgment result of Judgment 11 in Step 127 is NO, it is judged whether or not the relationship ΔS_X2(Yn_2)>ΔS_X2(Yn_1) is satisfied.

Processing 18 in Step 130

When the judgment result of Judgment 12 in Step 129 is YES, Case2 shown in Table 1 is adopted, and the capacitance detection signal change amounts $\Delta S\_X0(Yn\_1)+\Delta S\_X2(Yn\_2)$, $\Delta S\_X1(Yn\_1)+\Delta S\_X2(Yn\_2)$, $\Delta S\_X2(Yn\_2)$, $\Delta S\_X3(Yn\_2)$, $\Delta S\_X4(Yn\_2)$, $\Delta S\_X5(Yn\_2)$ are adopted as the signal detection values of the detecting electrodes X0 to X5 by the scanning electrode Yn.

Processing 19 in Step 131

When the judgment result of Judgment 12 in Step 129 is NO, Case3 shown in Table 1 is adopted, and the capacitance detection signal change amounts $\Delta S\_X0(Yn\_1)$, $\Delta S\_X1(Yn\_1)$, $\Delta S\_X2(Yn\_1)$, $\Delta S\_X3(Yn\_2)+\Delta S\_X2(Yn\_1)$, $\Delta S\_X4(Yn\_2)+\Delta S\_X2(Yn\_1)$, and $\Delta S\_X5(Yn\_2)+\Delta S\_X2(Yn\_1)$ are adopted as the signal detection values of the detecting electrodes X0 to X5 by the scanning electrode Yn.

Note that, in Processing 11 and Processing 14, the common noise amounts (NS_CMP1 and NS_CMP2) may be calculated from an average of fluctuation amounts of the capacitance detection signals of the detecting electrodes detected at the same time, may be a minimum fluctuation value, or may be an intermediate value, for example.

Further, in Processing 13 and Processing 15, the capacitance detection signal change amounts are calculated with the capacitance detection signals while the touch panel is not touched as reference values. Each of the reference values may be an average value of the capacitance detection signals in a period of no touch.

The flow chart illustrated in FIG. 17 is different from the flow chart illustrated in FIG. 5 of the first embodiment described above in the portions of noise removal in Processing 12 and Processing 15. In those portions, values for actually removing noise are calculated from the common noise amount calculated in Processing 11 or Processing 14 and the noise amount correction values illustrated in FIG. 16. For example, noise is removed by an amount obtained by integrating the noise amount correction values illustrated in FIG. 16 with the common noise amount.

Figure 18:
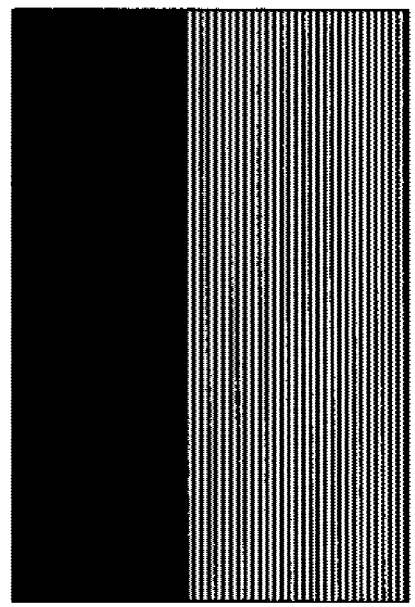
FIG. 18 is a diagram illustrating an example of a display pattern of the display according to the second embodiment of the present invention.
Figure 19:
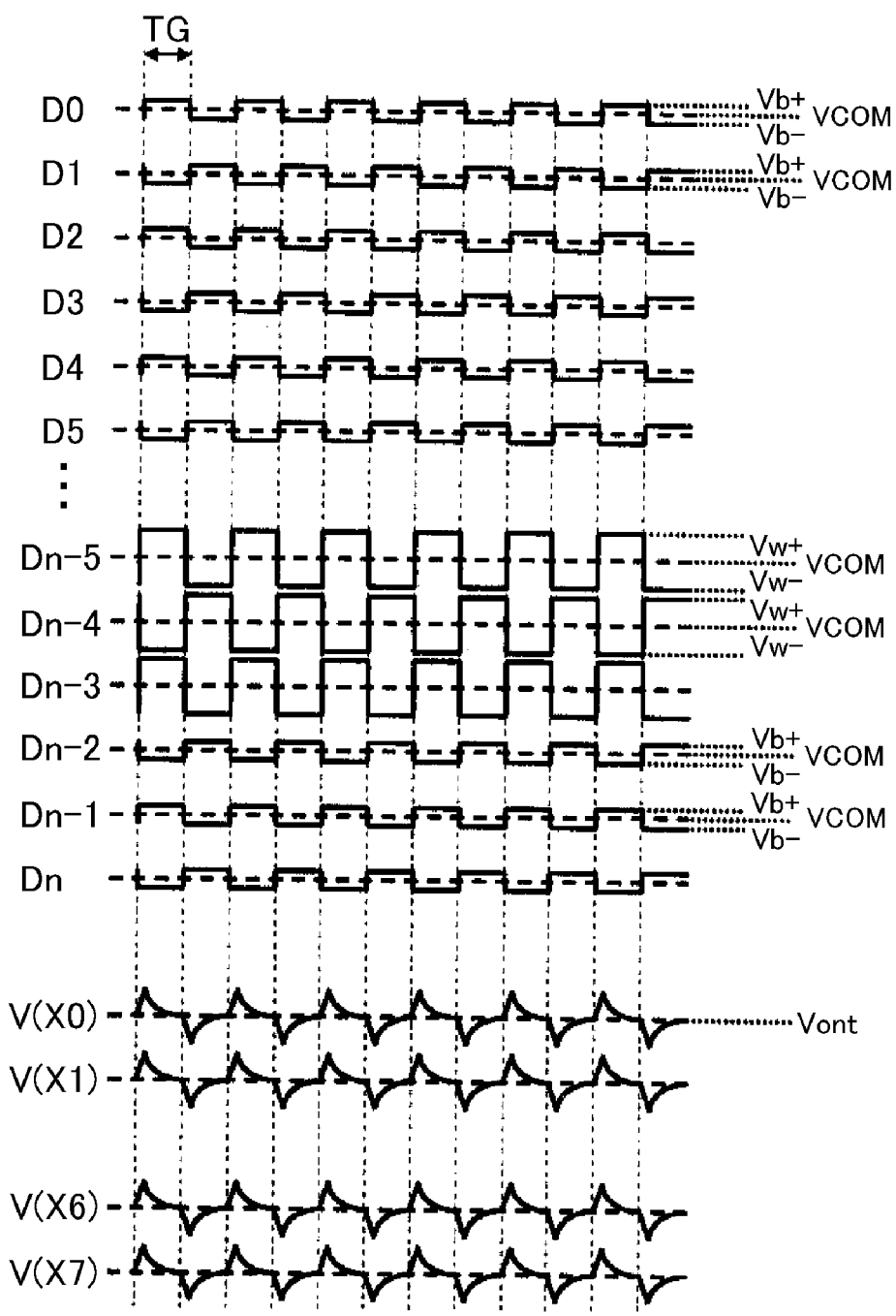
FIG. 19 is a waveform diagram illustrating waveforms of video voltages applied to video lines D0 to Dn illustrated in FIG. 11, and noise waveforms generated in detecting electrodes X0 to X7 illustrated in FIG. 12, in a case where the display pattern illustrated in FIG. 18 is displayed on a liquid crystal display by a dot inversion driving method.
Figure 20:
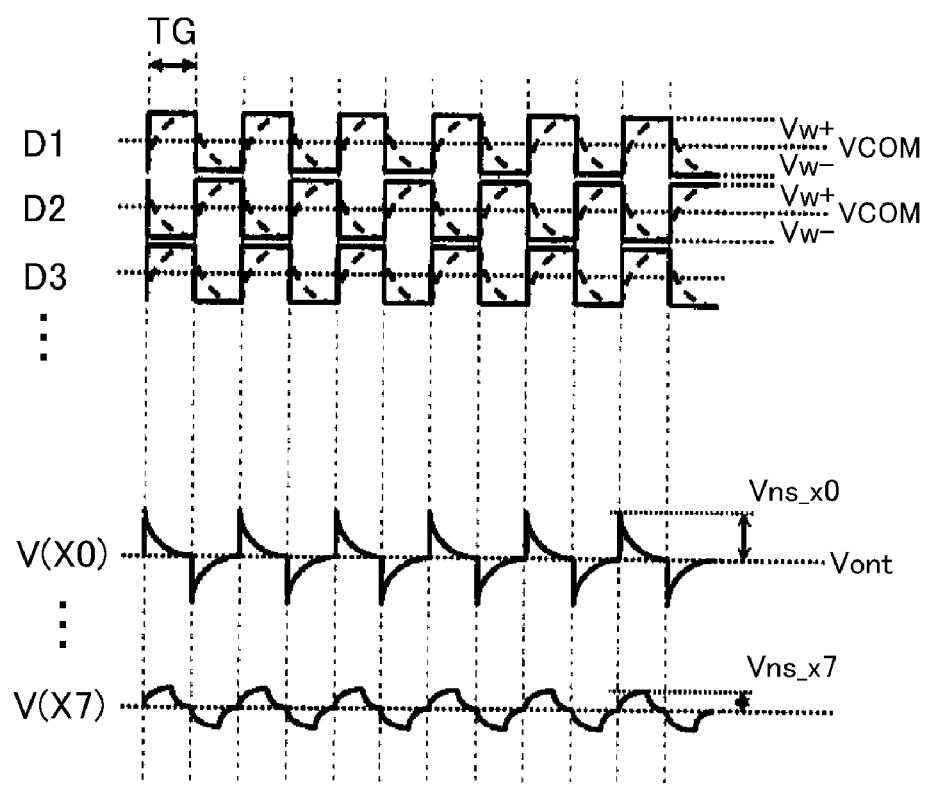
FIG. 20 is a waveform diagram illustrating a voltage waveform at an end near a driving circuit (driver) and a voltage waveform at an end far from the driving circuit of the video voltages applied to the video lines D0 to Dn illustrated in FIG. 11, and noise waveforms generated in the detecting electrodes X0 to X7 illustrated in FIG. 12.

FIGS. 18 to 20 are diagrams illustrating the effects of the second embodiment of the present invention.

FIG. 18 is a diagram illustrating an example of the display pattern of the display according to the second embodiment of the present invention, and illustrates the example of the display pattern in a case where the display varies depending on the location of the screen. In this case, the left side is a solid black display, and the right side is a vertical black and white stripe.

FIG. 19 is a diagram illustrating waveforms of video voltages applied to the video lines, and noise waveforms generated in the detecting electrodes of the touch panel illustrated in FIG. 12, in the case where the display pattern illustrated in FIG. 18 is to be displayed on a liquid crystal display.

FIG. 19 is a waveform diagram illustrating the waveforms of the video voltages applied to the video lines D0 to Dn illustrated in FIG. 11, and the noise waveforms generated in the detecting electrodes X0 to X7 illustrated in FIG. 12, in the case where the display pattern illustrated in FIG. 18 is displayed on the liquid crystal display by a dot inversion driving method. Note that, in FIG. 19, and in FIG. 20 to be described below, TG denotes one scanning period of the liquid crystal display.

As illustrated in FIG. 18, even in the case where the display are different in part (that is, the video voltages to be applied to the video lines D0 to Dn are different), the detecting electrodes X0 to X7 of the touch panel cross all the video lines of the display, and hence the effect of noise from the display is averaged. Therefore, noise may be effectively reduced in the noise removal method by using the common noise amount according to this embodiment, and the position may be detected at high accuracy.

FIG. 20 is a waveform diagram illustrating a voltage waveform at an end near a driving circuit (driver) and a voltage waveform at an end far from the driving circuit of the video voltages applied to the video lines D0 to Dn illustrated in FIG. 11, and noise waveforms generated in the detecting electrodes X0 to X7 illustrated in FIG. 12.

In the voltage waveform diagram of the video lines D1 to D3 of FIG. 20, the solid line denotes the voltage waveform at the end near the driving circuit (driver), and the broken line denotes the voltage waveform at the end far from the driving circuit.

At the end near the driving circuit (driver), the load due to the resistive capacitance is small, and hence the waveform on the video lines becomes steep. Accordingly, the voltage fluctuation, which leads to noise generated by coupling, becomes large, and hence the noise amount becomes large. On the other hand, at the end far from the driving circuit (driver), the waveform becomes mild because the load due to the resistive capacitance is large. Accordingly, the voltage fluctuation on the video lines becomes small, and hence the noise amount becomes small.

In other words, a peak value (Vns_x0) of a noise voltage (V(X0)) generated in the detecting electrode X0 becomes larger than a peak value (Vns_x7) of a noise voltage (V(X7)) generated in the detecting electrode X7.

In this manner, even in a case where there is the noise distribution due to the driving configuration of the display, when the noise distribution is measured as in this embodiment, the efficiency of the noise removal by using the common noise amount may be increased and hence the position may be detected at high accuracy.

As described above, in this embodiment, the effect of noise reduction by using the common noise amount is increased and highly accurate detection is realized, and hence a shield electrode may be omitted in the case of a separate touch panel (in which the touch panel is formed on another substrate).

Further, even in the case where the touch panel substrate is reduced in thickness, the effect of noise may be reduced, to thereby realize highly accurate detection. Further, in the case of the on-cell touch panel in which no shield electrode is provided and the distance between the electrode of the touchpanel and the electrode of the display is short, noise may be removed effectively, to thereby realize highly accurate position detection.

Hereinabove, the invention made by the present inventor has been specifically described based on the above-mentioned embodiments. However, it should be understood that the present invention is not limited to the above-mentioned embodiments, and various modifications may be made thereto without departing from the spirit of the invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A capacitive touch panel, comprising:
 a plurality of scanning electrodes arranged in a first direction;
 a plurality of detecting electrodes arranged in a second direction crossing the first direction;

a scanning circuit portion for dividing one detection period, in which a drive voltage is input to one scanning electrode of the plurality of scanning electrodes, into n sub detection periods, where n≥2, and inputting the drive voltage sequentially to the one scanning electrode in the sub detection periods 1 to n;

a capacitance detection circuit portion which detects a capacitance detection signal of each detecting electrode in a group of groups 1 to n, at the corresponding sub detection periods in the sub detection periods 1 to n; and a control circuit portion for calculating coordinates of a touch position based on the capacitance detection signal, wherein the plurality of detecting electrodes are divided into the groups 1 to n so that at least one of adjacent detecting electrodes is included in both of a first group and a second group as a shared electrode of both the first group and the second group, wherein the first group includes a detecting electrode which is not included in the second group, wherein the second group includes a detecting electrode which is not included in the first group, wherein a first detection period when the scanning circuit portion inputs the drive voltage to a first scanning electrode which is one of the plurality of scanning electrodes includes a first sub detection period and a second sub detection period, wherein, in the first sub detection period, only the detecting electrodes in the first group detect the drive voltage inputted to the first scanning electrode and the detecting electrodes in the second group other than the shared electrode do not detect the drive voltage, and wherein, in the second sub detection period, only the detecting electrodes in the second group detect the drive voltage inputted to the first scanning electrode and the detecting electrodes in the first group other than the shared electrode do not detect the drive voltage.

2. The capacitive touch panel according to claim 1, further comprising:

a second detection period when the scanning circuit portion inputs the drive voltage to a second scanning electrode which is another one of the plurality of scanning electrodes, the second detection period being a next period of the first detection period, includes a third sub detection period and a fourth sub detection period, wherein only the detecting electrodes in the first group detect the drive voltage inputted to the second scanning electrode in the third sub detection period, and wherein only the detecting electrodes in the second group detect the drive voltage inputted to the second scanning electrode in the fourth sub detection period.

3. The capacitive touch panel according to claim 2, wherein the second scanning electrode is inputted a predetermined voltage in the first detection period, and wherein the first scanning electrode is inputted the predetermined voltage in the second detection period.

4. The capacitive touch panel according to claim 3, wherein the predetermined voltage is a ground voltage.

5. The capacitive touch panel according to claim 1, wherein the scanning circuit portion does not input the drive voltage to the scanning electrodes except the first scanning electrode in the first detection period, and wherein the scanning circuit portion does not input the drive voltage to the scanning electrodes except the second scanning electrode in the second detection period.

6. The capacitive touch panel according to claim 5, wherein the scanning circuit portion inputs a ground voltage to the scanning electrodes except the first scanning electrode in the first detection period, and wherein the scanning circuit portion inputs the ground voltage to the scanning electrodes except the second scanning electrode in the second detection period.

7. The capacitive touch panel according to claim 1, wherein the scanning circuit portion inputs the drive voltage to the scanning electrodes one by one at a constant cycle.

8. The capacitive touch panel according to claim 1, wherein a number of the detecting electrodes in the first group is different from the number of the detecting electrodes in the second group.

9. The capacitive touch panel according to claim 1, wherein n≥3, and wherein the groups 1 to n includes a third group.

10. The capacitive touch panel according to claim 9, wherein at least one same detecting electrode is included in the second group and the third group adjacent to each other, wherein the second group includes a detecting electrode which is not included in the third group, and wherein the third group includes a detecting electrode which is not included in the second group.

* * * * *